United States Patent [19]

Eisenberg et al.

[11] Patent Number: 5,472,721
[45] Date of Patent: Dec. 5, 1995

[54] METHOD OF GRILLING AND/OR HEATING A FOOD PRODUCT, AND DEVICE THEREFOR

[75] Inventors: Roger Eisenberg, Marly; Michel Klinger, Stosswihr, both of France

[73] Assignee: SEB S.A., Selongey, France

[21] Appl. No.: 211,303

[22] PCT Filed: Jul. 20, 1993

[86] PCT No.: PCT/FR93/00742

§ 371 Date: Mar. 30, 1994

§ 102(e) Date: Mar. 30, 1994

[87] PCT Pub. No.: WO94/03094

PCT Pub. Date: Feb. 17, 1994

[30] Foreign Application Priority Data

Jul. 30, 1992 [FR] France .................................. 92 09677

[51] Int. Cl.$^6$ ...................................... H05B 1/02
[52] U.S. Cl. ............................ 426/243; 426/241; 99/331; 99/327; 219/497; 219/501
[58] Field of Search ................................ 99/326, 327, 331, 99/332, 334, 328, 333, 329 R, 329 RT, 329 P; 219/501, 497, 505, 494, 492, 507, 490; 426/242, 243, 241, 523, 520, 240, 248

[56] References Cited

U.S. PATENT DOCUMENTS

| | | | |
|---|---|---|---|
| 4,379,964 | 4/1983 | Kanazawa et al. | 99/327 |
| 4,700,052 | 10/1987 | Wolf et al. | 99/331 |
| 5,044,262 | 9/1991 | Burkett et al. | 99/327 |
| 5,088,389 | 2/1992 | Labadia | 99/327 |
| 5,324,917 | 6/1994 | Boyer et al. | 99/327 |

*Primary Examiner*—David Scherbel
*Assistant Examiner*—Reginald L. Alexander
*Attorney, Agent, or Firm*—Spensley Horn Jubas & Lubitz

[57] ABSTRACT

A process and apparatus for grilling and/or reheating a food product by subjecting the product, for an operating time T, to infrared radiation from at least one electrically operated unit for producing infrared radiation, the process comprising: setting a preestablished value for a frequency f; and varying, during at least part of the time T, the electrical supply to the electrically operated unit in a discontinuous manner between a first supply level during a time T1 and a second supply level, different from the first level, during a time T2 in cycles having the preestablished frequency f in order to generate infrared radiation of variable wavelength, wherein 1/f=T1+T2 whereby the product is heated by the infrared radiation.

25 Claims, 3 Drawing Sheets

METHOD OF GRILLING AND/OR HEATING A FOOD PRODUCT, AND DEVICE THEREFOR

TECHNICAL FIELD

The present invention relates to the general technical field of processes and devices having as their object the grilling or reheating of edible food products, by submission to infrared radiation.

The invention concerns a process for grilling and/or reheating a food product of the meat or bread type, for example, in which one subjects the food product to infrared radiation from one or several electric grilling means during a period of time T representing the total grilling cycle of the product.

The present invention also concerns a device for implementing the grilling and/or reheating process, more particularly adapted to grilling of bread products such as breads, grilled sandwiches, Viennese baked products and others. The present invention is not limited to this particular type of food products, but can be extended to grilling and/or reheating of meat based products.

PRIOR ART

Bread toasters known in the prior art are generally constituted by a heating chamber within which extend grilling and/or reheating means forming infrared radiation emission sources. In a conventional manner, infrared emission sources can be constituted of quartz bars containing a resistive wire, or steatite bars on which a resistive wire is coiled in a spiral manner. In such apparatus, the grilling process consists in exposing the bread to substantially constant infrared radiation for the entire duration of the grilling period. These standard processes imply a continuous delivery of electricity to the resistive wire starting from the closing of a main switch operated by the user, and this, during a total grilling period previously set equally by the user. Generally, the loading on the resistive wire is of the order of 4 to 9 watts per square centimeter, the temperature attained by the wire being between 800° and 1000° C. The temperature rise time of the resistive wire is generally of the order of 40 seconds. Conventional bread toasters functioning according to this principle do not permit variation of the quality of the grilling. In effect, constancy of the electrical supply induces an equally constant infrared radiation, only the parameters relative to the total grilling time being variable. This limitation in the regulation possibilities can be considered as a drawback, to the extent where the quality of grilling of a bread product is a function of two parameters, which is the more or less dark color of the grilled product, and its crusty structure expressed in quantity of water extracted. In conventional apparatus of the prior art, such as those described previously, it is impossible to act in separate ways on these two parameters since the possibility of regulating the apparatus is limited to regulation of total grilling time. In such a case, a reduction in the total grilling time equally leads to a reduction in the quantity of water extracted and correspondingly a light color of the grilled product. Inversely, any increase in the total grilling time is translated by a browning of the product and a drying connected to the augmentation of the quantity of water extracted. Known bread toasters of the prior art are also considered as having a temperature rise time which is too long.

SUMMARY OF THE INVENTION

The present invention seeks in consequence to remedy the problems mentioned above, and to furnish a process and apparatus for grilling and/or reheating a food product, permitting attainment of an extended range of possibilities for grilling and/or reheating.

Another object of the invention is to furnish a process and a device for grilling and/or reheating a food product in which the time of grilling and/or reheating is reduced.

A complementary object of the invention is to furnish a process for grilling and/or reheating of a food product in which the regulating possibilities offered to the user are enlarged without useless complications.

The objects assigned to the invention are achieved with the aid of a process for grilling and/or reheating a food product of the meat or bread type, for example, in which said product is subjected to infrared radiation from at least one electric grilling means for an operating time T characterized in that it consists in varying during the time T, the electrical supply to the grilling means according to at least one preestablished cycle of frequency (f) in order to generate infrared radiation of equally variable wavelength.

The objects assigned to the invention are also achieved with the aid of a device for carrying out the grilling and/or reheating process equipped with a heating chamber provided with grilling means comprising bars on which is coiled a resistive wire characterized in that it comprises:

- a means for controlling the variation of the electric supply of the resistive wire, according to a cycle of frequency (f) in the course of which the electric supply is maintained during a duration T1 and interrupted during a duration T2;
- means for regulating the ratio T1/T2;
- regulatable general timing means for determining the time T of grilling.

BRIEF DESCRIPTION OF THE DRAWINGS

Other particularities and advantages of the invention will appear and become more apparent from a reading of the description presented herebelow, with reference to the attached drawings, given by way of illustrative, nonlimiting examples in which.

MANNER OF PRACTICING THE INVENTION

Figure 4:
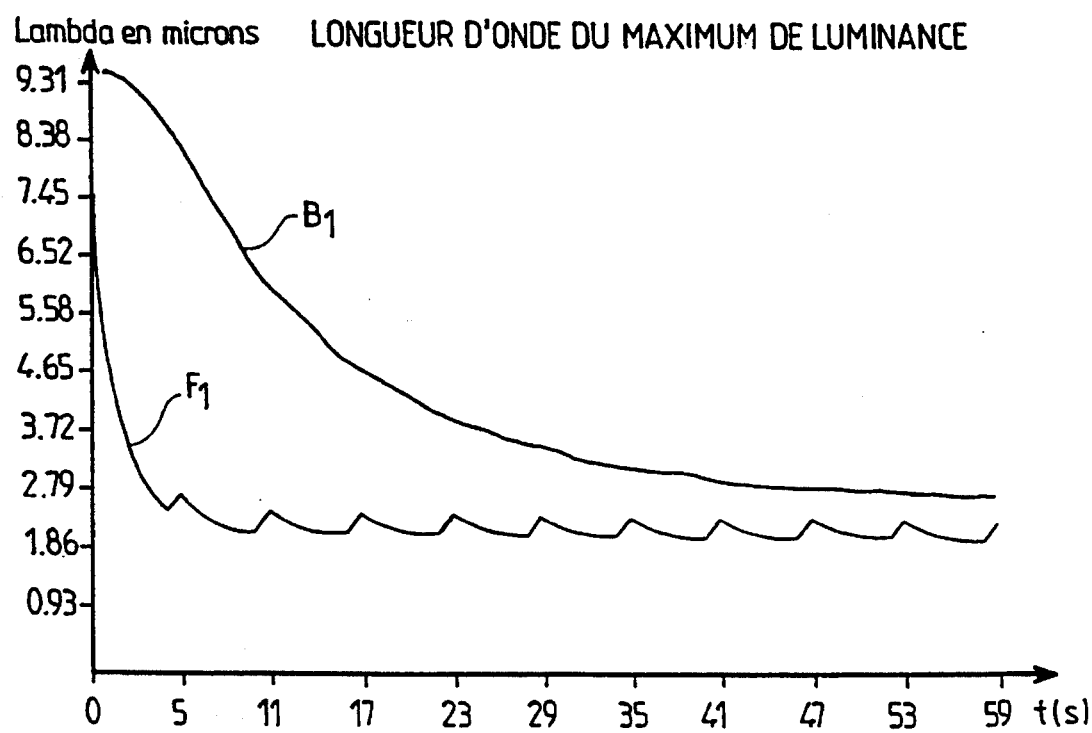
FIG. 4 shows a graph representing the evolution in time of infrared radiation of each of the radiation emitting sources according to the process conforming to the invention.
Figure 5:
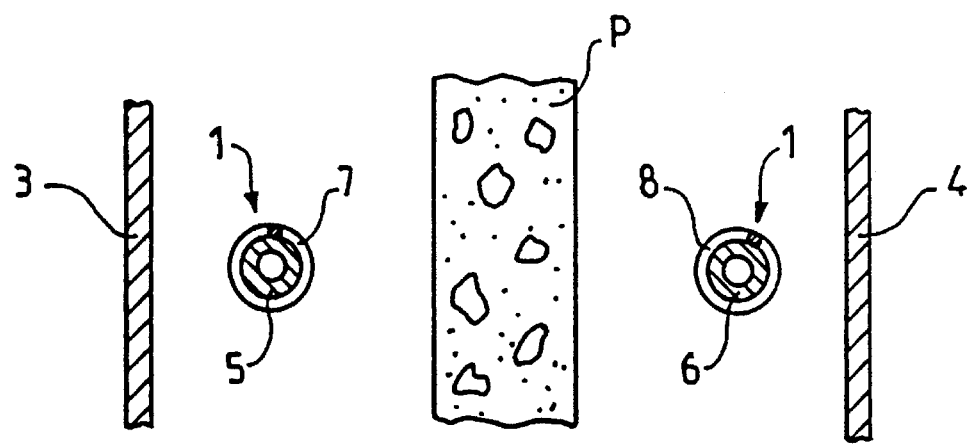
FIG. 5 shows, according to a schematic transverse cross section, an example of a device for carrying out the process of the invention.

The process of grilling and/or reheating a food product of the meat or bread type for example, consists in subjecting, as shown in FIG. 5, product P to infrared radiation from at least one, and preferably two electric grilling means 1. In the embodiment shown in FIG. 4, product P is constituted by a slice of bread inserted into a heating chamber defined by two exterior walls 3, 4. Advantageously, electric grilling means 1 are constituted by two bars, respectively 5, 6, for example of circular cross section and made of steatite, on which are wound in a spiral form two resistive wires 7, 8.

In the entire description which follows more specific reference will be made to a process of grilling bread slices utilizing a toaster, but it is obvious that the process according to the invention can be applied to the grilling of all types of baked articles or even meat based products. In this latter case, the device for carrying out the grilling process according to the invention is a meat grill. The process according to the invention is equally not limited to the grilling function, but also includes in a manner which is exclusive or not, the function of reheating a food product whether meat based or bread based. In this latter case, the principal applications envisioned are those relative to reheating of cooked dishes or products such as grilled sandwiches for example.

Figure 1:
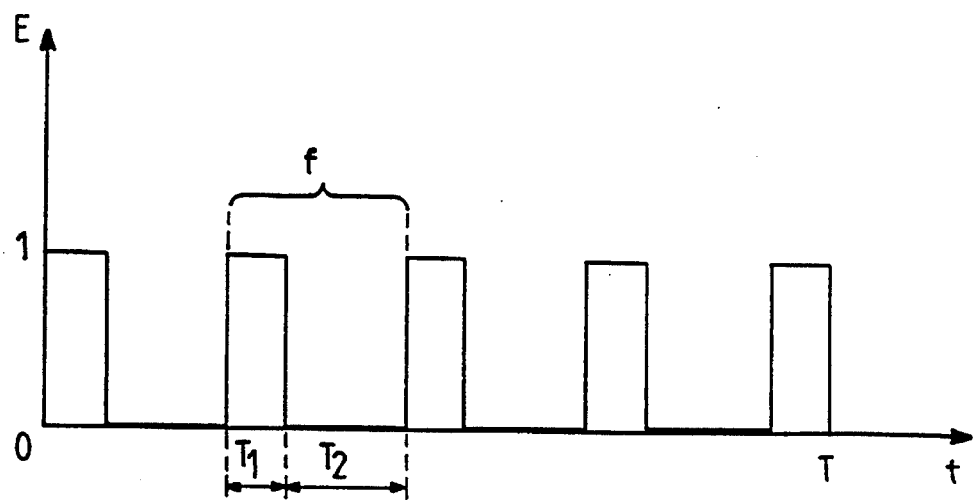
FIG. 1 shows the cycle of variation of electrical supply according to the process of the invention.

The process of grilling and/or reheating according to the invention consists in subjecting the product P to the action of electric grilling means 1 during an operating time T representing the total grilling or reheating time. The time T can be, as effected in conventional grilling processes, determined by the user himself by means of appropriate regulating units. The essential step of the process according to the invention consists, once the total grilling or reheating time T is determined, in varying, during this time T, the electric supply to the grilling means 1 according to a preestablished cycle of frequency f. According to a preferred embodiment, the electric supply varies in a discontinuous manner during each cycle of frequency f, such as shown in the graph of FIG. 1, between a supply state designated 1 and a non-supply state designated 0. The process according to the invention thus consists, as shown in FIG. 1, in supplying during the time T, in a sequential manner, according to a succession of cycles of frequency f the electric grilling means. Each cycle of frequency f can be broken down into a supply time T1 of the electric grilling means on the one hand, and a non-supply time T2 on the other hand. During each cycle of frequency f, infrared radiation generated by the electric grilling means is thus equally characterized by an equally variable wavelength. Advantageously, the ratio of the supply time T1 to the non-supply time T2 is constant during each cycle of frequency f during the time T, but can vary from one time T to another, preferably within a range of between 0.1 and 6. The variation of the ratio T1/T2 can be achieved directly by the user as a function of the degree of grilling or reheating desired. In effect, a ratio T1/T2 substantially equal to 0.3, corresponding for example to a time T1 substantially equal to 5 seconds and a time T2 substantially equal to 15 seconds, induces a moderated time functioning of the grilling means 1, reproducing a function called defrosting. A ratio T1/T2 substantially equivalent to 0.5 corresponding for example to a time T1 close to 5 seconds and a time T2 close to 10 seconds, can be assimilated to a reheating function. In this case, the grilling means 1 commence to become red. In the same manner, a ratio of T1/T2 equivalent to 0.1 corresponds to a heat maintaining function, while a ratio close or equal to 0.95 corresponds to a cooking or a grilling called maximum.

In the same manner, the cycle of frequency f can be variable and regulated by the user himself in a range of variation between 0.033 and 3 (30 and 0.33 seconds) and preferably between 0.1 and 2. The cited preferred range corresponds to practical values of utilization by the user during which the sum T1+T2 is thus variable between around 0.5 and 10 seconds.

It is obviously conceivable to measure out the supply of energy for grilling in other ways, and notably for example by chopping the supply current for the apparatus.

The grilling and/or reheating process according to the invention has equally for its object to obtain an increased grilling yield. In this connection, the average wavelength will be between 2.1 and 4.3 microns and preferably close to 2.1 microns, the spectrum of the total radiation wavelength being comprised substantially in a range varying from 0.9 to 10 microns. In this case, the average temperatures which should be attained by these grilling means are close to 1100° C. For attaining temperatures of this order, the process according to the invention consists in subjecting the product to the action of one or several grilling means possessing a surface power comprised between 10 and 15 watts per square centimeter and preferably comprise between 11 and 12 watts per square centimeter.

The process according to the invention consists consequently in increasing, during each cycle of frequency f, the temperature of the grilling means 1 up to a temperature range between 900° and 1100° C. Advantageously, the time period T corresponding to the total grilling time will be as short as possible, and for this purpose temperatures comprised in the range 900°–1100° C. will be attained in less than 15 seconds during each cycle of frequency f, preferably in less than 10 seconds, the standard cycle of frequency f being close to 0.16 (6 seconds). The standard cycle of frequency f corresponds to a time T1 of around 4.25 seconds and a time T2 of 0.75 second, and thus to a ratio T1/T2=5.66.

It has been found particularly advantageous to achieve as quickly as possible the operating temperature of the resistive wire, which is 900° to 1100° C. For this purpose, the first cycle of frequency f starting a time T will be preceded by a stage of preheating the wire, during the course of which the electric supply is not cycled. Advantageously, this preheating step will be of the order of 10 seconds for a standard cycle.

It has been found equally that for large ratios $T_1/T_2$, of the order of 5 to 6 for example, an excessive grilling of the product can occur, principally toward the end of the time T, and in particular during the last third of said time T. In order to avoid the risk that overgrilling can result therefrom, it is provided, preferably starting at the beginning of the last third of the period T, to cause an automatic decrease, advantageously in a discontinuous manner, of the ratio T1/T2 to bring it to a value close to 1.5. Practically, for an operating time T=100 seconds and a standard frequency cycle in which T1=4.25s and T2=0.75s, this becomes in the last third time of 30 seconds to function according to the same cycle f but with T1=3s and T2=2s. In a general manner, the ratio T1/T2 thus varies according to at least two values.

As shown in FIG. 5, the process according to the invention consists in subjecting during each cycle of frequency f, the product to the action of at least one, and preferably two grilling means 1 each formed by at least two distinct sources emitting heat and infrared radiation. In the present case, the sources are constituted respectively by a bar of steatite 5, 6 and a resistive wire 7, 8, each source possessing different thermal inertia and infrared radiation spectrum characteristics. One particularity of the process according to the invention consists in furnishing sufficient electric energy during each time T1 for the bars 5, 6 to be brought to at least their threshold of reddening by heating of resistive wire 7, 8 for a significant duration during the course of the time T. In this manner, each bar 5, 6 acts like a secondary infrared emitter having a strong thermal inertia, in addition to the first infrared source constituted by each resistive wire 7, 8 of low thermal inertia.

Figure 2:
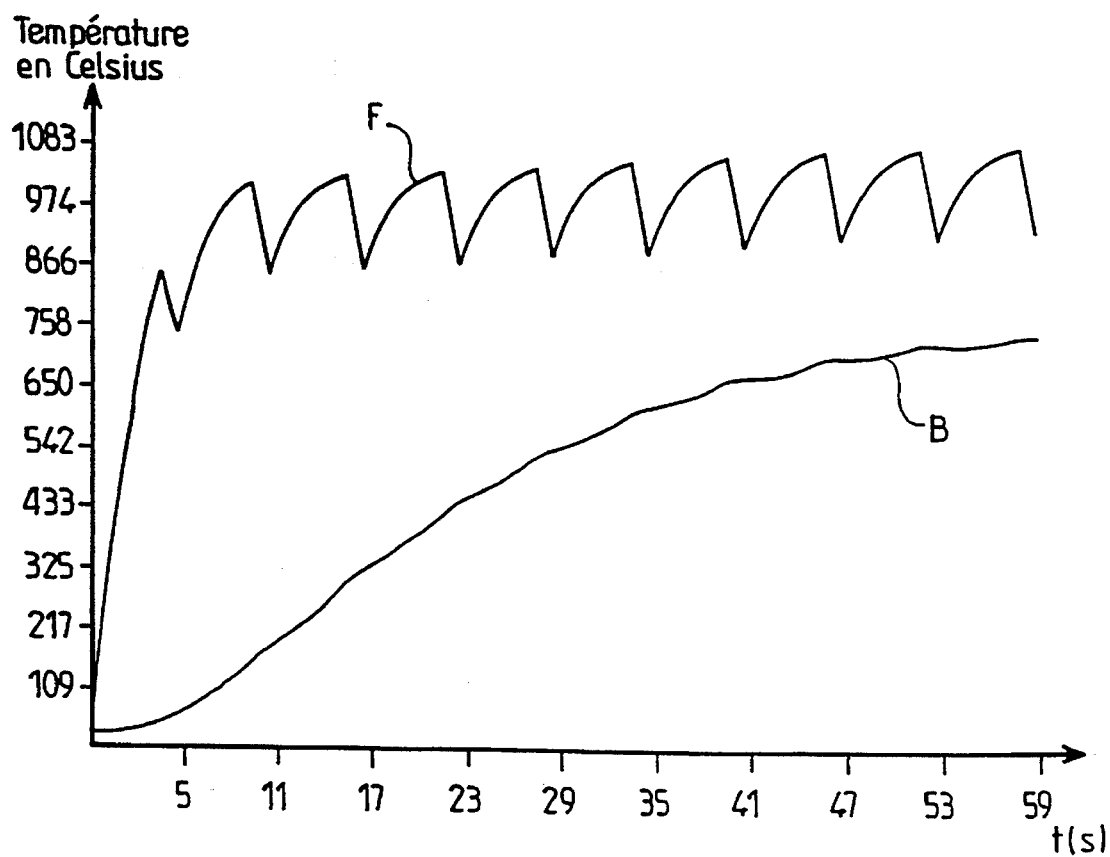
FIG. 2 is a graph representing the time variation of temperature of two infrared emitting sources according to the process of the invention.

Such a phenomenon is for example shown on the graphs of FIG. 2 which represents for a total grilling time T of around 60 seconds, curves of respective temperature increases of the bar B and of the resistive wire F. The graph was established for a standard cycle of frequency f in which T1 is equal to 5 seconds and T2 to 1 second. In this embodiment, the steatite bar attains in 30 seconds a temperature close to 604° C. while during the course of each cycle of frequency f the resistive wire has a temperature varying substantially between 850° and 1000° C. During the course of each cycle of frequency f, the minimum and maximum temperatures attained by the resistive wire can be considered as constant. For the same cycle of frequency f, the graph of FIG. 4 shows the variation in time of the maximum wavelength of illumination for each radiation emitting source, to wit the curve B1 relative to the bar and the curve F1 relative to the resistive wire. By the end of the first cycle of frequency f, the resistive wire attains its steady state corresponding to an average grilling wavelength close to 2 microns. Because of its high thermal inertia, the bar only attains its average grilling wavelength close to 3 microns close to the end of a period of around 30 seconds. Regardless of the cycle of frequency f considered, the first part of the grilling time T representing for example 20–50% of the operating time T is characterized by a maximum grilling or reheating activity of the resistive wire, the activity of the bar being almost negligible or at least differentiated in time since its activity increases regularly. The second and last part of the grilling or reheating time T is characterized by a substantially homogeneous grilling action by each of the two sources of infrared radiation.

According to an advantageous version of the process according to the invention, the grilling means are subjected during each cycle of frequency f to a strong loading which does not diminish the useful life of the resistive wire because of the cycling of the electric supply. The use of a switched supply permits, consequently, the selection of resistive wires having diminished resistive capacities, without at the same time diminishing the useful life of the apparatus.

Figure 3:
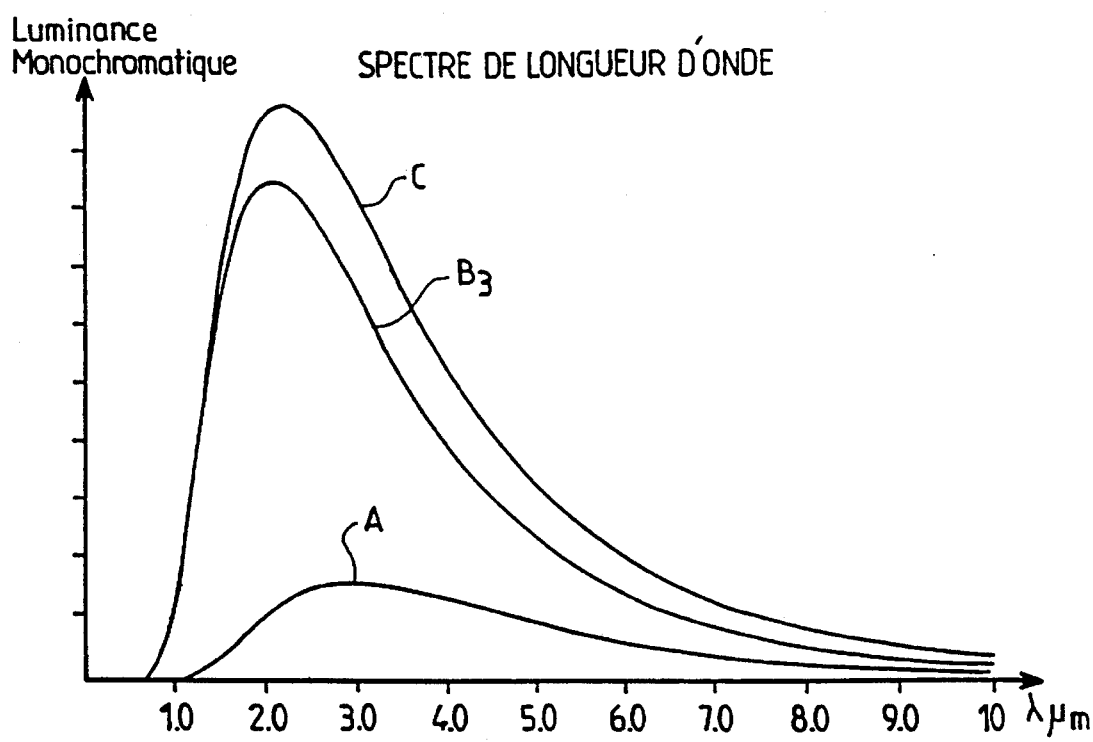
FIG. 3 shows a graph representing the infrared radiation spectrum of the radiation emitting sources according to the process conforming to the invention.

On the basis of the standard cycle of frequency f mentioned previously, the graph of FIG. 3 shows the distribution of wavelength spectra for each grilling means 1, the graph A showing the wavelength spectrum of the steatite bar, the graph B3 the variation of the wavelength spectrum of the resistive wire, the graph C representing the overall wavelength spectrum variation.

One understands that for the intrinsic characteristics given for the bar and the resistive wire, it is possible by varying on the one hand the operating time T, and on the other hand the frequency cycle f and/or the ratio T1/T2, to obtain by the process according to the invention, a multitude of possibilities for regulation and operating mode. This leads to a mastery of the temperature increase of each of the sources, as well as a mastery of their respective and cumulative infrared radiation variations. It is thus possible by changing the ratio T1/T2, to minimize, even cancel, the supply of infrared radiation due to the steatite bar in the frequencies which are significant for small ratios. At the extreme, with a ratio T1/T2 in the vicinity of 0.1, it is found conceivable to dry bread slices while grilling them on their exterior faces to obtain the equivalent of melba toast.

Figure 6:
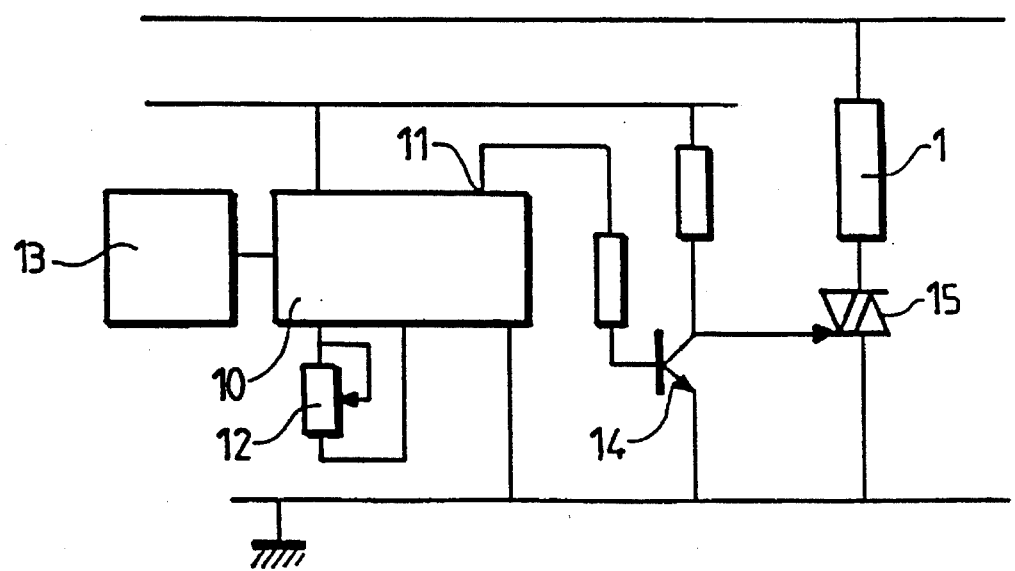
FIG. 6 shows an electrical diagram of the principle of the installation of an electric grilling means conforming to the invention and functioning according to the process of the invention.

FIG. 6 shows a schematic diagram of an embodiment of an electric unit capable of being installed in a device for carrying out the process according to the invention. The electric units includes a means 10 for controlling variation of the electric supply of the resistive wire 7, 8. The means 10 for controlling the variation of the electric supply can be advantageously constituted by an oscillator based on two integrated circuits, such as for example NE555 or NE556 permitting a signal transmitted to an outlet 11 to be varied according to a cycle of frequency f. The oscillator is connected to a means for regulating the ratio T1/T2 constituted advantageously by a potentiometer 12. The oscillator can equally be connected to a general timing means 13 which is adjustable by the user and intended to control the functioning of the oscillator during one or several predetermined fixed times, corresponding to the grilling period T.

The electric signal transmitted by outlet 11 can be subjected to the action of an amplifier 14 according to the integrated circuit or installation utilized. The electric unit finally includes a switching element 15 controlled by the oscillator and intended to assure depending on the nature of the low voltage signal coming from the outlet 11, the sequenced interruption of the electric supply of the grilling means 1. The switching element 15 can be constituted by a triac or preferably an electromagnetic relay performing the dual function of bipolar circuit breaker and electric supply interrupter.

Of course, any other switching unit capable of performing an equivalent function can be utilized.

According to an advantageous embodiment of the invention, the device can include a programmed electronic unit, or a specific circuit which allows integration in a single housing of the oscillator, a circuit establishing interdependence between the means 12 for regulating ratio T1/T2 and the general timing means 13, divider stages and outlets, circuits for calculating compensations taking into account the heating of the apparatus and the rest time between two grilling periods.

In this case, the circuit for interdependence permits assumption of a function of coupling and of automatic compensation of the regulation of the parameters of grilling, to wit the time T and the ratio T1/T2. In effect, if schematically the regulation of time T can be assimilated to a parameter for monitoring the color of the grilled product, and the regulation of the ratio T1/T2 to a monitoring of the level of energy furnished, regulation of one of these parameters should advantageously be accompanied by a simultaneous and compensating regulation of the other parameter if one wishes to obtain a product which has been grilled precisely as desired.

INDUSTRIAL APPLICATION POSSIBILITIES

The process according to the invention finds its preferred application in all types of grilling apparatus whether they are toasters or meat grills, or even reheating apparatus. After introduction of the product to be grilled or reheated into the heating enclosure, the user, according to the nature of the product, can himself regulate with the aid of appropriate regulating units, on the one hand the time T of grilling and of reheating, and on the other hand the cycle of frequency f, as well as the ratio T1/T2. It has thus found possible to obtain with the combination of regulation of each of these parameters an extended range of regulation possibilities.

We claim:

1. Process for grilling and/or reheating a food product by subjecting the product, for an operating time T, to infrared radiation from at least one electrically operated means for producing infrared radiation, said process comprising: setting a preestablished value for a frequency f; and varying, during at least part of the time T, the electrical supply to the electrically operated means in a discontinuous manner between a first supply level during a time T1 and a second supply level, different from the first level, during a time T2 in cycles having the preestablished frequency f in order to generate infrared radiation of variable wavelength, wherein 1/f=T1+T2 whereby the product is heated by the infrared radiation.

2. Process according to claim 1 wherein the second supply level is a zero level in which no power is supplied to the electrically operated means.

3. Process according to claim 2 wherein during each cycle having frequency f, T1/T2 has a ratio between 0.1 and 6.

4. Process according to claim 2 wherein the frequency f is between 0.033 and 3 Hz.

5. Process according to claim 4 wherein the frequency f is between 0.1 and 2 Hz.

6. Process according to claim 1 comprising, before said varying step, a preliminary step of preheating the electrically operated means without varying the electric supply to the electrically operated means.

7. Process according to claim 6 wherein said preliminary step of preheating is performed for a period of the order of 10 seconds.

8. Process according to claim 1 further comprising causing T1/T2 to vary, during the time T, between at least two distinct values.

9. Process according to claim 8 wherein said step of causing T1/T2 to vary includes causing T1/T2 to decrease toward the end of the time T.

10. Process according to claim 8 wherein said step of causing T1/T2 to vary includes causing T1/T2 to decrease toward the last third of time T.

11. Process according to claim 7 wherein said step of varying includes maintaining T1/T2 constant during the time T.

12. Process according to claim 2 wherein said step of varying comprises causing the electrically operated means to have a surface power of between 10 and 15W/cm2.

13. Process according to claim 2 wherein said step of varying comprises causing the electrically operated means to have a surface power of between 11 and 12 W/cm2.

14. Process according to claim 2 wherein said step of varying comprises causing the temperature of the electrically operated means to increase, during each cycle having the frequency f, up to a range of between 900° and 1100° C. in less than 15 seconds.

15. Process according to claim 2 wherein said step of varying comprises causing the temperature of the electrically operated means to increase, during each cycle having the frequency f, up to a range of between 900° and 1100° C. in less than 10 seconds.

16. Process according to claim 1 wherein said step of varying comprises subjecting the product to infrared radiation having an average wavelength of between 2.1 and 4.3μ.

17. Process according to claim 1 wherein said step of varying comprises subjecting the product to infrared radiation having an average wavelength substantially equal to 2.1μ.

18. Process according to claim 1 wherein the electrically operated means is formed by at least two distinct sources emitting heat and infrared radiation, each source possessing respectively different thermal energy and infrared radiation spectrum characteristics, and said step of varying comprises subjecting, during each cycle having the frequency f, the product to the action of the two distinct sources.

19. Process according to claim 18 wherein the two sources include: a first source constituted by a resistive wire having a low thermal inertia; and a second source constituted by a support bar having a high thermal inertia and on which said wire is wound, said bar being brought to at least its reddening threshold by heating of said wire.

20. Process according to claim 19 wherein the bar is made of steatite.

21. Process according to claim 1 further comprising effecting a compensating and coupled regulation of the time duration T and of T1/T2.

22. Device for carrying out the grilling and/or reheating process according to the process of claim 7, said device comprising a heating chamber containing said electrically operated means and means for supplying electric power to said electrically operated means, wherein said electrically operated means comprising at least one bar (5,6) and a resistive wire (7,8) coiled on said bar, and said device further comprises:

a means (10) for controlling the supply of electric power supply of said resistive wire (7,8), in the cycles having the frequency f in the course of each cycle of which the electric supply is maintained during a time T1 and interrupted during a time T2;

means (12) for regulating T1/T2; and regulatable general timing means (13) for determining the duration of time T, and wherein said means (10) for controlling comprise a switching element (15) for assuring a sequenced interruption of the electrical supply to said electrically operated means according to the cycles having the frequency f.

23. Device according to claim 22 wherein:

said means (10) for controlling is constituted by an oscillator;

said means for regulating T1/T2 is constituted by a potentiometer (12); and said switching element (15) is a triac or an electromagnetic relay.

24. Device according to claim 22 further comprising a circuit for interdependently controlling the means (12) for regulating T1/T2 and the regulatable general timing means (13) in order to permit an automatic compensating regulation of the value of T1/T2 relative to the duration of time T, and vice versa.

25. Device according to claim 22 constituted by a toaster.

* * * * *